(12) United States Patent
Yamaguchi et al.

(10) Patent No.: US 9,141,163 B2
(45) Date of Patent: Sep. 22, 2015

(54) PORTABLE TERMINAL, RECORDING MEDIUM

(71) Applicants: NTT DOCOMO, INC., Chiyoda-ku (JP); Renesas Electronics Corporation, Kawasaki-shi (JP)

(72) Inventors: Kumiko Yamaguchi, Tokyo (JP); Tetsuhiro Tanno, Tokyo (JP); Kunio Yoshikawa, Tokyo (JP); Tomohiro Akiyama, Tokyo (JP); Tetsuhiro Sasagawa, Tokyo (JP); Kazuaki Gemma, Kanagawa (JP); Satoshi Akita, Kanagawa (JP); Norihisa Yamamoto, Kanagawa (JP)

(73) Assignees: NTT DOCOMO, INC., Chiyoda-ku (JP); Renesas Electronics Corporation, Kawasaki-shi (JP)

( * ) Notice: Subject to any disclaimer, the term of this patent is extended or adjusted under 35 U.S.C. 154(b) by 0 days.

(21) Appl. No.: 14/235,657

(22) PCT Filed: Feb. 20, 2013

(86) PCT No.: PCT/JP2013/054142
§ 371 (c)(1),
(2) Date: Jan. 28, 2014

(87) PCT Pub. No.: WO2013/125566
PCT Pub. Date: Aug. 29, 2013

(65) Prior Publication Data
US 2014/0181543 A1    Jun. 26, 2014

(30) Foreign Application Priority Data

Feb. 22, 2012   (JP) ................................ 2012-036356

(51) Int. Cl.
*H04B 7/00*   (2006.01)
*H04B 5/00*   (2006.01)
(Continued)

(52) U.S. Cl.
CPC ............. *G06F 1/266* (2013.01); *G06F 1/263* (2013.01); *H04B 1/3816* (2013.01);
(Continued)

(58) Field of Classification Search
CPC .... G06F 1/263; G06F 1/266; H04W 52/0229; H04W 52/0274; H04W 52/0277; H04B 1/3816; H04M 1/7253; H04M 2250/04
USPC ................... 455/41.1, 41.2, 41.3, 574, 552.1
See application file for complete search history.

(56) References Cited

U.S. PATENT DOCUMENTS

2013/0127600 A1*   5/2013   Li et al. ........................ 340/10.5

FOREIGN PATENT DOCUMENTS

| JP | 2009-70005 | 4/2009 |
| JP | 2009-303107 | 12/2009 |

(Continued)

OTHER PUBLICATIONS

Office Action issued Apr. 1, 2014, in Japanese Patent Application No. 2012-036356 (with English-language translation).
International Search Report issued May 7, 2013, in PCT/JP13/054142 filed Feb. 20, 2013.
Ishibashi, et al., "UIM Realizing Highly-Secure Mobile Contactless Services," Toshiba Review, 2010, vol. 65, No. 2, pp. 56-59, (with English Abstract).

(Continued)

*Primary Examiner* — Ping Hsieh
(74) *Attorney, Agent, or Firm* — Oblon, McClelland, Maier & Neustadt, L.L.P.

(57) ABSTRACT

A portable terminal supplies power to a chip card therein with host power off. A power controller supplies power from a battery to a host, the chip card, and a CLF; a first switch opens/closes a power supply channel to the chip card, branching from a power supply channel from the power controller to the host; a second switch opens/closes a power supply channel to the chip card, branching from a power supply channel from the power controller to the CLF; a switch controller opens the first switch and closes the second switch if the CLF detects a contactless RF signal, if the host is off or if the portable terminal is in a low battery mode, and if the contactless RF signal conforms to the communication method of the chip card, and the switch controller closes the first switch and opens the second switch if the host is on.

4 Claims, 7 Drawing Sheets

(51) Int. Cl.
*H04B 1/38* (2015.01)
*G06F 1/26* (2006.01)
*H04W 52/02* (2009.01)
*H04B 1/3816* (2015.01)
*H04M 1/725* (2006.01)

(52) U.S. Cl.
CPC ..... *H04W 52/0229* (2013.01); *H04W 52/0274* (2013.01); *H04W 52/0277* (2013.01); *H04M 1/7253* (2013.01); *H04M 2250/04* (2013.01); *Y02B 60/50* (2013.01)

(56) References Cited

FOREIGN PATENT DOCUMENTS

| | | |
|---|---|---|
| JP | 2011-14030 | 1/2011 |
| JP | 2012-33163 | 2/2012 |
| WO | WO 2011/124078 A1 | 10/2011 |
| WO | WO2011/124078 A1 * | 10/2011 ............ H04M 1/675 |

OTHER PUBLICATIONS

Office Action issued Jun. 8, 2015, in European Patent Application No. 13751402.2—1959/2706431 PCT/JP2013054142.

* cited by examiner

PORTABLE TERMINAL, RECORDING MEDIUM

TECHNICAL FIELD

The present invention relates to a portable terminal having a contactless communication function, a program therefor, and a recording medium therefor.

BACKGROUND ART

Recently, chip cards equipped with an SE function, for use in portable terminals, have come into use. Non-patent literature 1 includes a UIM card implementing a high-security function that can be applied to contactless communication.

PRIOR ART LITERATURE

Non-Patent Literature

Non-patent literature 1: Takanobu Ishibashi, Ryouichi Kuriyama, "UIM Realizing Highly-Secure Mobile Contactless Services," Toshiba Review, 2010, Volume 65, No. 2, pp. 56-59

SUMMARY OF THE INVENTION

Problems to be Solved by the Invention

It has generally been the case that power is not supplied to a chip card in a portable terminal while the host power is off. This is because electrical power wastage is reduced since the functions of the chip card in the portable terminal have not been conventionally needed while the power is off However, if the chip card in a portable terminal has an SE function, as described above, the user will be inconvenienced if a contactless communication application on the SE mounted to the chip card in the portable terminal cannot be used because power is not supplied to the chip card in the portable terminal while the host is off. In one method, power is continuously supplied from the battery to the chip card in the portable terminal, so that the contactless communication application on the SE mounted to the chip card in the portable terminal can be used while the host power is off.

With this power supply method, however, power is continuously supplied to the chip card in the portable terminal, causing power to be wasted because power is consumed even while the chip card in the portable terminal does not need to be turned on.

In view of the above situation, an object of the present invention is to provide a portable terminal that can supply power efficiently to a chip card in the portable terminal when a carrier wave is detected, even while the host power is off or while the battery level of the portable terminal is low.

Means to Solve the Problems

A portable terminal according to the present invention includes a host unit, a battery, a power control unit, a chip card in the portable terminal, a CLF unit, an antenna, a first switch, a second switch, and a switch control section.

The power control unit supplies power generated by the battery to the host unit, the chip card in the portable terminal, and the CLF unit. The first switch is connected to open or close a power supply channel to the chip card in the portable terminal, branching off from a power supply channel from the power control unit to the host unit. The second switch is connected to open or close a power supply channel to the chip card in the portable terminal, branching off from a power supply channel from the power control unit to the CLF unit. The switch control section opens the first switch and closes the second switch if the CLF unit detects a contactless RF signal, if the host unit is off or the portable terminal is in a low battery mode, and if the contactless RF signal conforms to the communication method of the chip card in the portable terminal, and the switch control section closes the first switch and opens the second switch if the host unit is on.

Effects of the Invention

The portable terminal of the present invention allows power to be supplied to the chip card in the portable terminal efficiently when a carrier wave is detected even while the host power is off or while the battery of the portable terminal is low. By supplying power to the chip card in the portable terminal without passing through the CLF, in normal cases such as while the host power is on, power wastage and increased startup time can be prevented.

DETAILED DESCRIPTION OF THE EMBODIMENTS

Now, embodiments of the present invention will be described in detail. Elements having identical functions will be denoted by the same reference numerals, and overlap in description will be avoided.

[Terminology]

[SE]

SE is short for a secure element. The SE includes an area for storing confidential information needed to make an electronic payment using a portable terminal, a memory holding encryption key information, and a processor that executes cryptographic processing.

[Chip Card to be Inserted into Portable Terminal]

A chip card to be inserted into a portable terminal is a chip card that can be inserted into a portable terminal among chip cards having an embedded integrated circuit for recording data and performing operations. Examples of chip cards inserted into portable terminals include UICC cards, UIM cards, and SIM cards. In the embodiments described below, use of a UICC card as an example chip card to be inserted into a portable terminal will be described in detail, but the present invention is not confined by the described embodiments and can be implemented by a variety of chip cards inserted into portable terminals.

UICC is short for universal integrated circuit card. The UICC is a smart card for use in GSM (registered trademark) and UMTS mobile devices.

[GSM (Registered Trademark)]

GSM (registered trademark) is short for global system for mobile communications. GSM (registered trademark) is a standard prescribed for second-generation mobile phones using the FDD-TDMA technique.

[UMTS]

UMTS is short for universal mobile telecommunications system. UMTS is a European standard prescribed for third-generation mobile phones.

[Smart Card]

A smart card is also called a chip card and has a larger storage capacity, more advanced functions, and a higher level of security than magnetic cards. The card includes connection terminals, a chip, and a plastic card.

[SIM Card]

A SIM card is a subscriber identity module card. The SIM card is a chip card that has a recorded unique identification number for identifying a telephone number used by a GSM (registered trademark) or W-CDMA mobile phone.

[UIM Card]

A UIM card is a user identity module card. The UIM card is a chip card used for W-CDMA (UMTS) technology in third-generation mobile communication systems and is an expanded version of the SIM card used in GSM (registered trademark) mobile phones.

[CLF]

CLF is short for contactless front end. The CLF is a chip for performing wireless contactless communication.

[SWP]

SWP is short for single wire protocol. SWP is a physical layer specification of full duplex communication of up to 1.6 Mbps, using a single terminal. SHDLC (simplified HDLC) is specified on the data link layer above, and HCI (host control interface) is specified on the network layer.

[RF]

RF is short for radio frequency. Although RF generally means a high-frequency electrical signal that can be used in wireless communication, RF in this description mainly refers to a carrier wave for contactless communication.

[Normal Battery, Normal Battery Mode]

A state of a portable terminal in which the host can be turned on is referred to as normal battery or a normal battery mode in this description. More specifically, the lowest remaining battery level at which the host power can be kept on is specified as a threshold A (as a percentage, or the ratio of the remaining battery level to the battery capacity, for example), and a state in which the remaining battery level exceeds the threshold A will be referred to as a normal battery or a normal battery mode.

[Low Battery, Low Battery Mode]

A state of a portable terminal in which, although the host power cannot be turned on, power can be supplied to a limited part is referred to as low battery or a low battery mode in this description. More specifically, the lowest remaining battery level at which power can be supplied to a limited part is specified as a threshold B (as a percentage, or the ratio of the remaining battery level to the battery capacity, for example), and a state of a portable terminal in which the remaining battery level exceeds the threshold B and falls below the threshold A will be referred to as a low battery or a low battery mode.

[Type A]

A contactless chip card standard. This type is used for the age verification chip cards for smokers in Japan.

[Type B]

A contactless chip card standard. This type is used for the Basic Resident Registration cards and the driver's license cards in Japan.

[First Embodiment]

Figure 1:
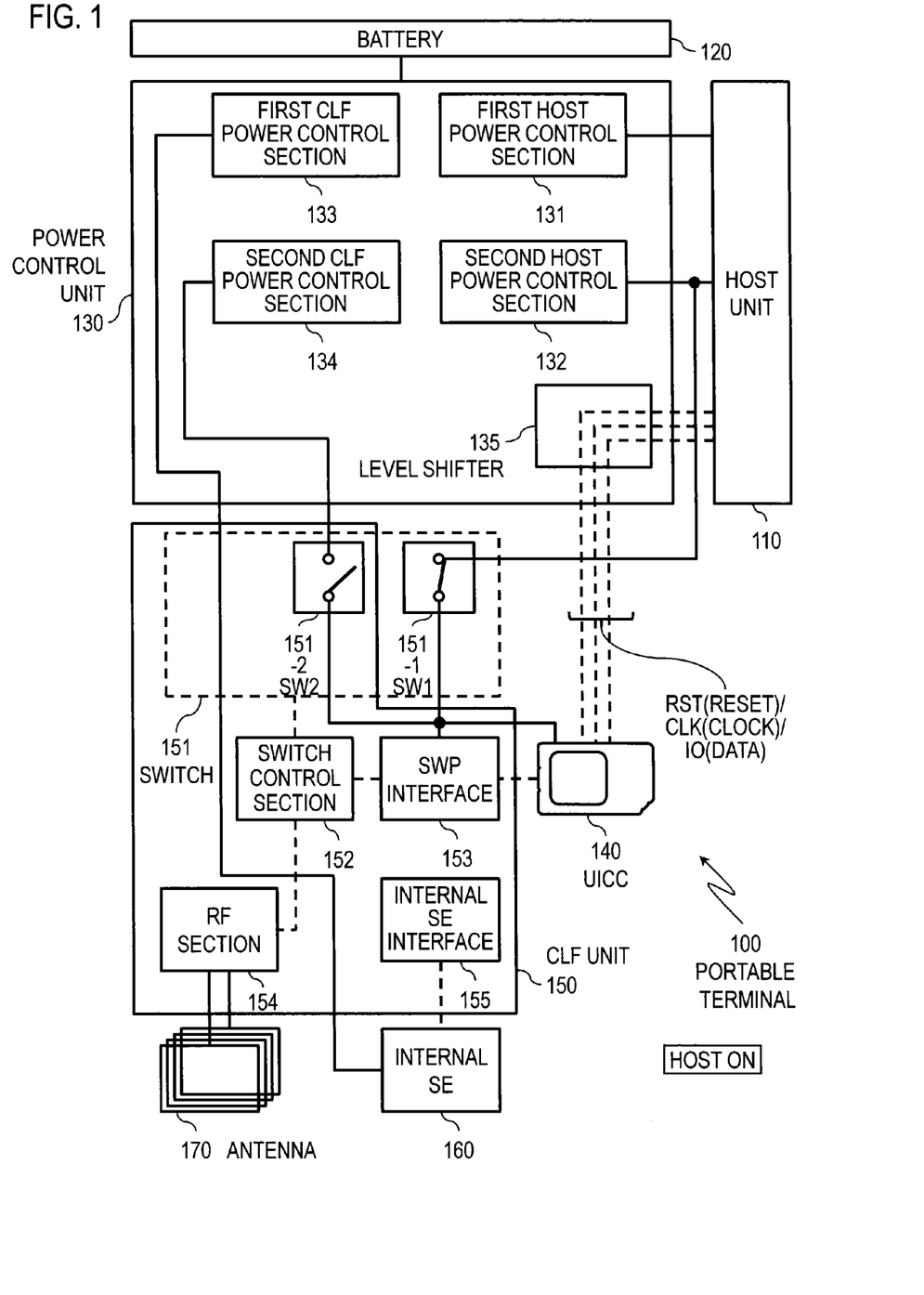
FIG. 1 is a block diagram showing the configuration and a state (host on state) of a portable terminal according to a first embodiment of the present invention.
Figure 2:
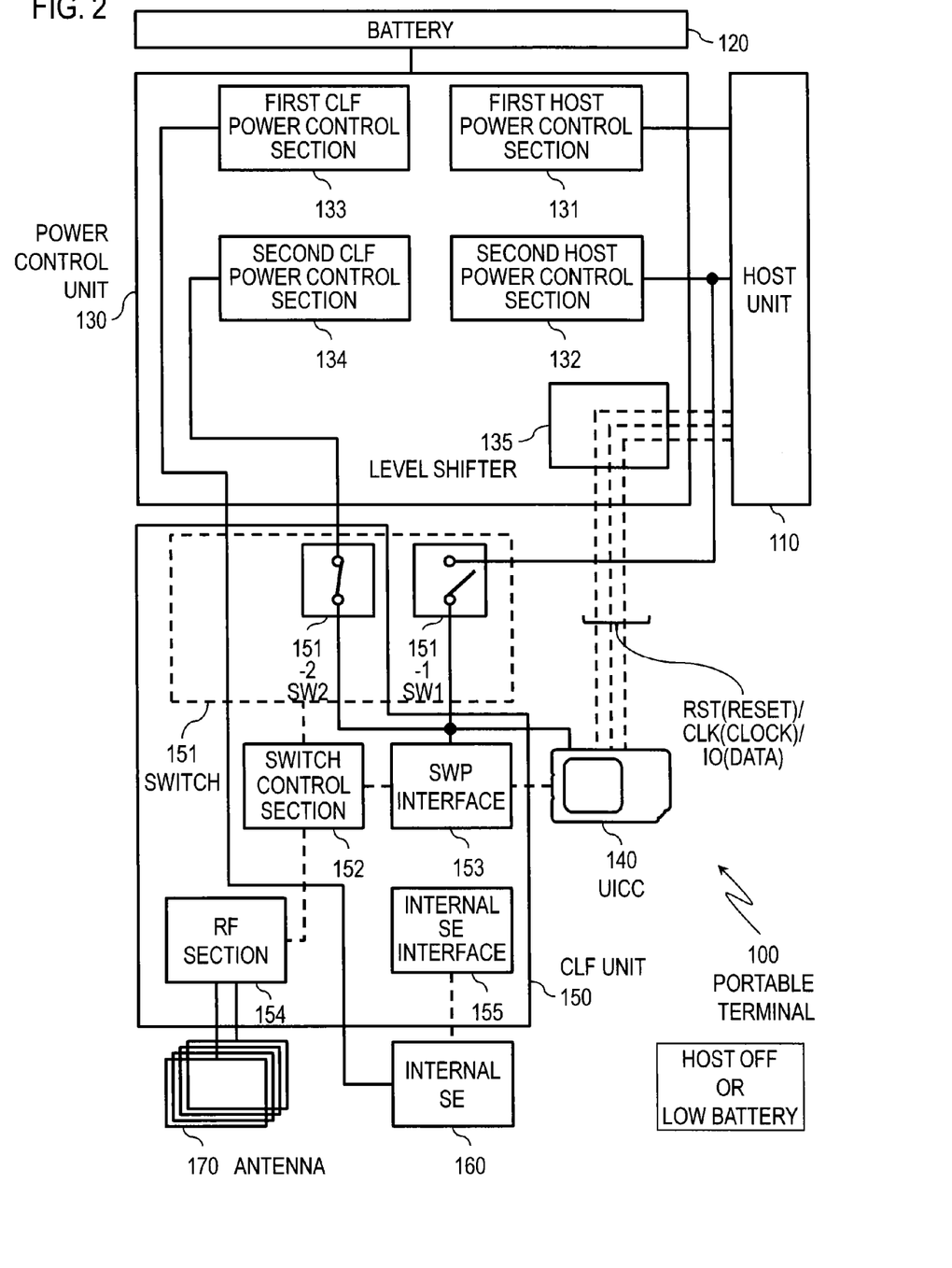
FIG. 2 is a block diagram showing the configuration and another state (host off state or low battery) of the portable terminal according to the first embodiment.
Figure 3:
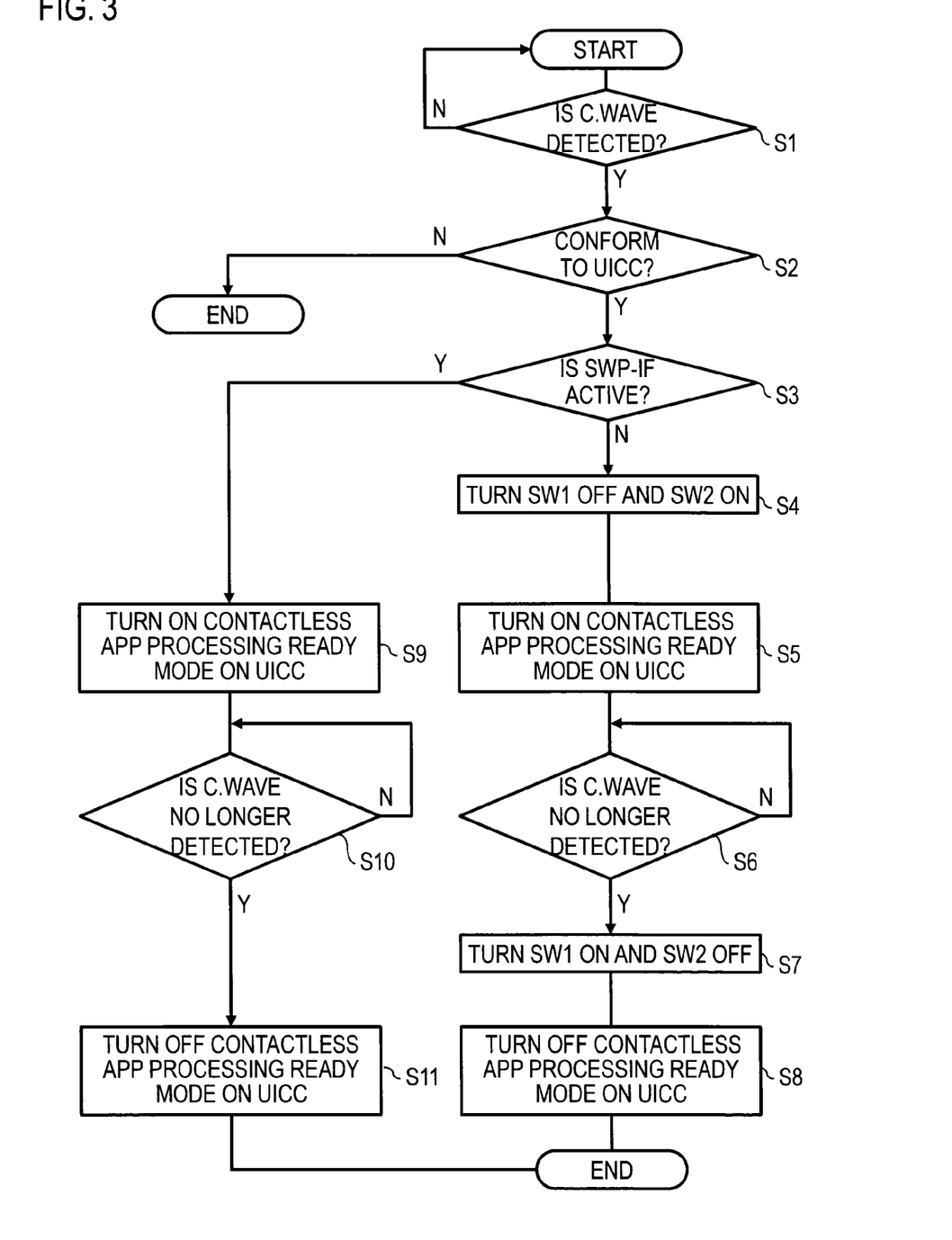
FIG. 3 is a flowchart illustrating the operation of the portable terminal according to the first embodiment.

A portable terminal in a first embodiment, which is the most basic configuration of the present invention, will be described in detail with reference to FIGS. 1, 2, and 3. FIG. 1 is a block diagram showing the configuration and a state (host on state) of a portable terminal 100 according to this embodiment. FIG. 2 is a block diagram showing the configuration and another state (host off state or low battery) of the portable terminal 100 according to this embodiment. FIG. 3 is a flowchart illustrating the operation of the portable terminal 100 according to this embodiment.

The portable terminal 100 in this embodiment includes a host unit 110, a battery 120, a power control unit 130, a UICC 140, a CLF unit 150, an internal SE 160, an antenna 170, and a first switch (SW1) 151-1. The power control unit 130 includes a first host power control section 131, a second host power control section 132, a first CLF power control section 133, a second CLF power control section 134, and a level shifter 135. The CLF unit 150 includes a second switch (SW2) 151-2, a switch control section 152, an SWP interface 153, an RF section 154, and an internal SE interface 155. The first switch (SW1) 151-1 and the second switch (SW2) 151-2 are referred to collectively as a switch 151.

The power control unit 130 will be described next. The first host power control section 131 and the second host power control section 132 supply power to the host unit 110. Here, for example, the battery 120 has a power-supply voltage of 3.0 V or higher; the first host power control section 131 and the second host power control section 132 are set to generate different voltages, such as 3.0 V and 1.8 V, respectively; then appropriate voltages can be supplied to the circuits in the host unit 110 and the UICC 140, which are operated by the two independent voltages (such as 3.0 V and 1.8 V). The first CLF power control section 133 and the second CLF power control section 134 supply power to the CLF unit 150. In the same way as described above, the first CLF power control section 133 and the second CLF power control section 134 are set to generate different voltages, such as 3.0 V (or lower than 3.0 V) and 1.8 V, respectively. Then, appropriate voltages can be supplied to the circuits in the CLF unit 150 and the UICC 140. The level shifter 135 is used when the power-supply voltage for RST, CLK, and IO of the host differs from the power-supply voltage on the UICC side (for example, one voltage is 3 V and the other voltage is 1.8 V). The level shifter 135 is not used when a common voltage of 1.8 V is used as the power-supply voltage for RST, CLK, and IO of the host and the power-supply voltage on the UICC side. The first switch 151-1 is connected to open or close a power supply channel to the UICC 140 and the SWP interface 153, branching off from a power supply channel from the second host power control section 132 to the host unit 110.

The CLF unit 150 will be described next. The second switch 151-2 is connected to open or close a power supply channel to the UICC 140 and the SWP interface 153, branching off from a power supply channel from the second CLF power control section 134 to the CLF unit 150. The switch control section 152 controls the switching of the individual switches 151-1 and 151-2 of the switch 151. The SWP interface 153 functions as an interface to the SWP. The RF section 154 detects a contactless RF signal. The internal SE interface 155 functions as an interface to the internal SE 160.

The switching operation executed by the switch control section 152 will be described next. First, the initial states of the first switch 151-1 and the second switch 151-2 are the closed state and the open state, respectively (the states shown in FIG. 1). At power-up, since power to the UICC 140 is supplied through the first switch 151-1, the functions of the portable terminal 100 can be initialized without activating the CLF unit 150. If the RF section 154 detects a contactless RF signal (Yes in S1), if the contactless RF signal received by the RF section 154 conforms to the UICC communication method (Yes in S2), and if the host unit 110 is off (the host unit 110 is stopped although the remaining battery level is sufficient), that is, if power is not supplied to the SWP interface 153 through the first switch 151-1 and if the SWP interface 153 is not active (No in S3), then the switch control section 152 opens the first switch and closes the second switch (S4, states shown in FIG. 2).

If the RF section 154 detects a contactless RF signal (Yes in S1), if the contactless RF signal conforms to the communication method of the UICC 140 (Yes in S2), and if the portable terminal is in the low battery mode, that is, if power is not supplied to the SWP interface 153 through the first switch 151-1 and if the SWP interface 153 is not active (No in S3), then the switch control section 152 opens the first switch and closes the second switch (S4, states shown in FIG. 2). In that case, the UICC 140 turns on the contactless app processing ready mode (S5). If the carrier wave is no longer detected after that (Yes in S6), the switch control section 152 closes the first switch and opens the second switch to return the switch 151 to its initial state (S7). Then, the UICC 140 turns off the contactless app processing ready mode (S8, end). If the host unit 110 is on (the SWP interface 153 is active) in step S3 (Yes in S3), the first switch is kept closed and the second switch is kept open, as in the initial states, and the UICC 140 turns on the contactless app processing ready mode (S9). In that case, power is supplied to the UICC 140 through the first switch 151-1. If the carrier wave is no longer detected after that (Yes in S10), the UICC 140 turns off the contactless app processing ready mode (S11, end). If the contactless RF signal detected by the RF section 154 does not conform to the communication method of the UICC 140 (No in S2), the subsequent switch control operation is not performed (end). Packets conforming to the communication method of the UICC 140 include packets of types A and B.

Although the CLF unit 150 contains the second switch 151-2 and the switch control section 152 in this embodiment, the switch 151 and the switch control section 152 may also be disposed independently outside the CLF unit 150.

In the portable terminal 100 in this embodiment, the switch control section 152 controls the switch 151 in accordance with the state of the host unit 110. Even if the host unit 110 is in the power-off state or if the portable terminal 100 is in the low battery state, when the carrier wave is detected, a stable supply of power can be provided to the UICC 140 efficiently. Normally, such as when the host power is on, power is supplied to the chip card in the portable terminal, not through the CLF, and consequently power wastage and increased startup time can be prevented.

[Second Embodiment]

Figure 4:
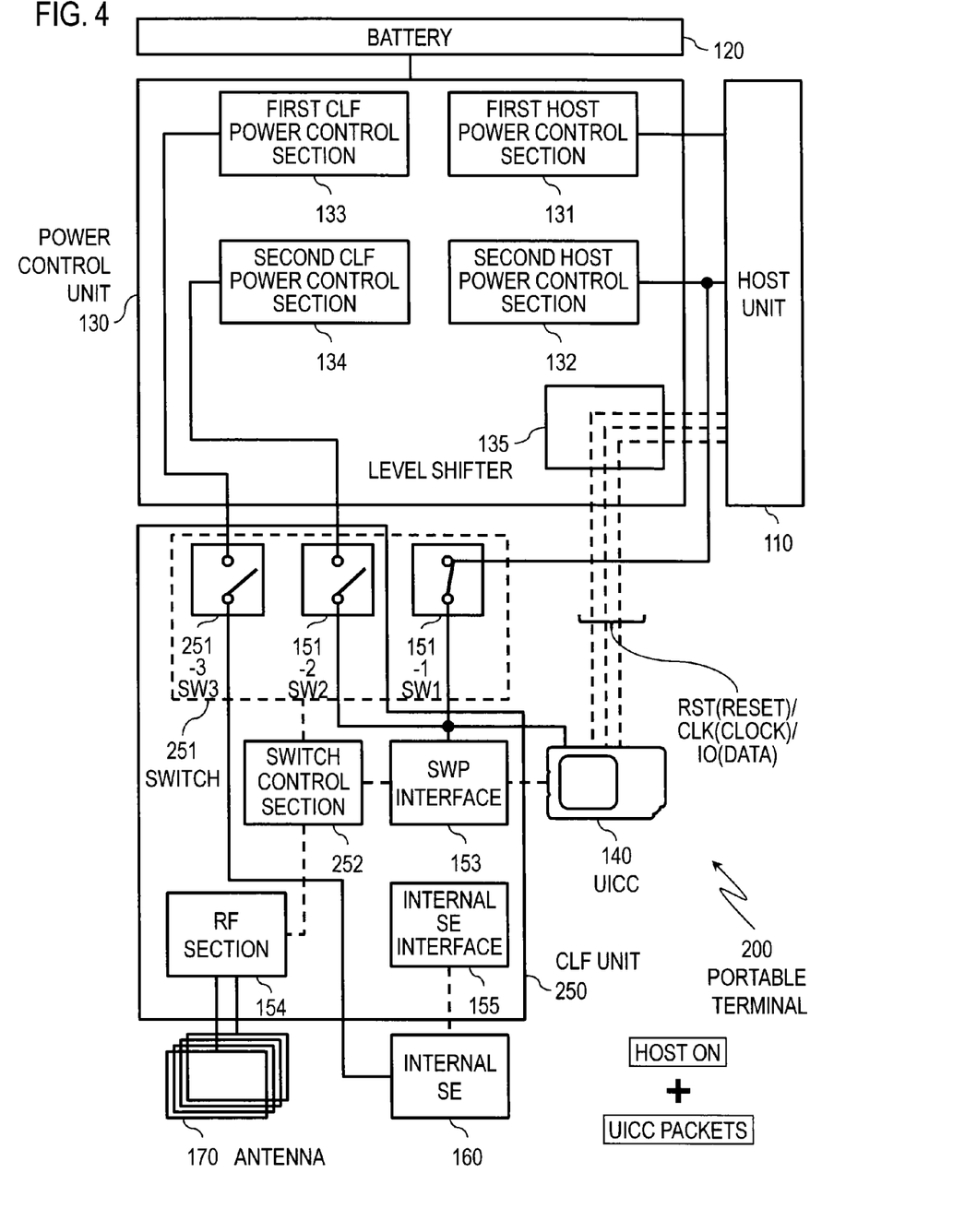
FIG. 4 is a block diagram showing the configuration and a state (host on state with UICC packets received) of a portable terminal according to a second embodiment.
Figure 5:
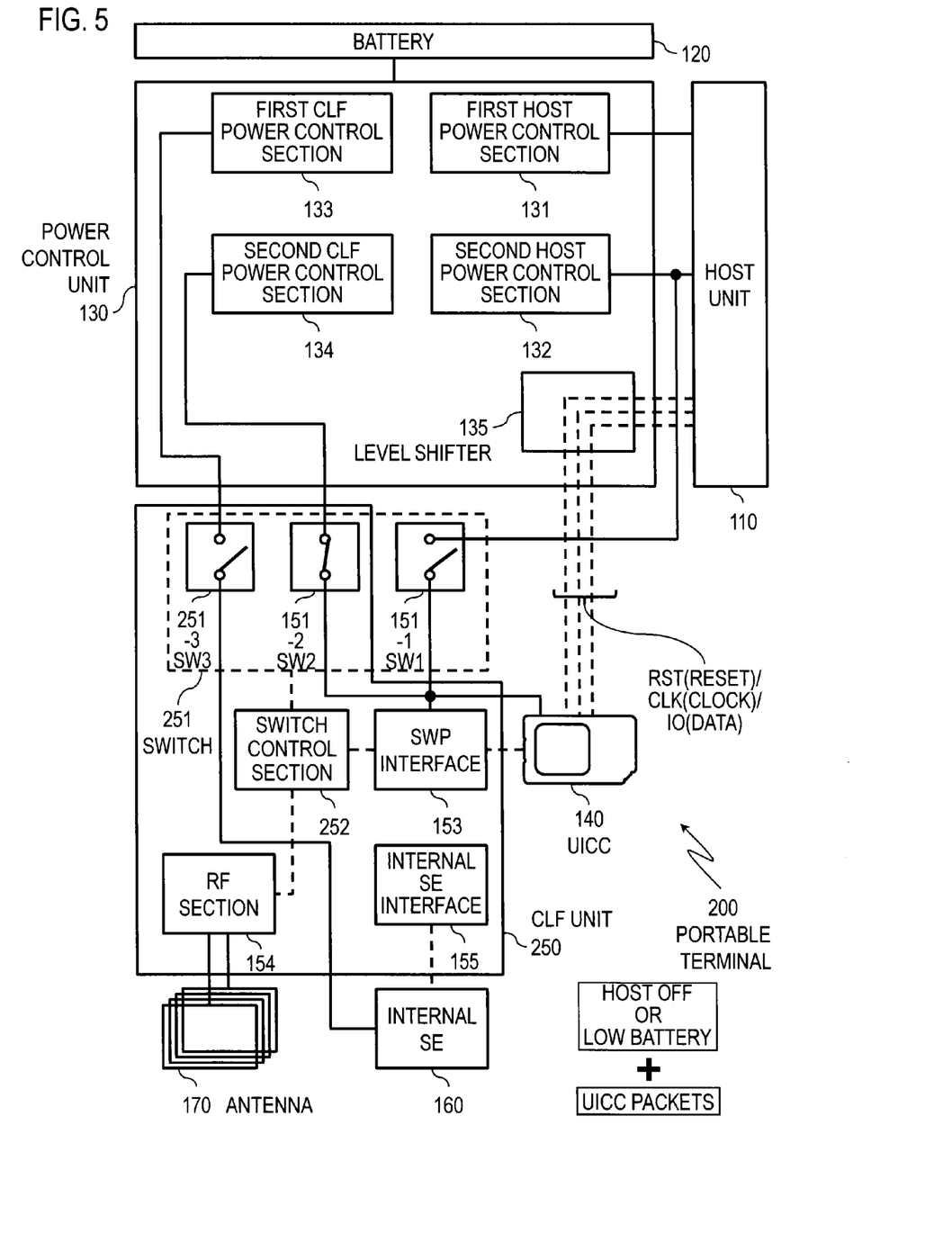
FIG. 5 is a block diagram showing the configuration and another state (host off state or low battery with UICC packets received) of the portable terminal according to the second embodiment.
Figure 6:
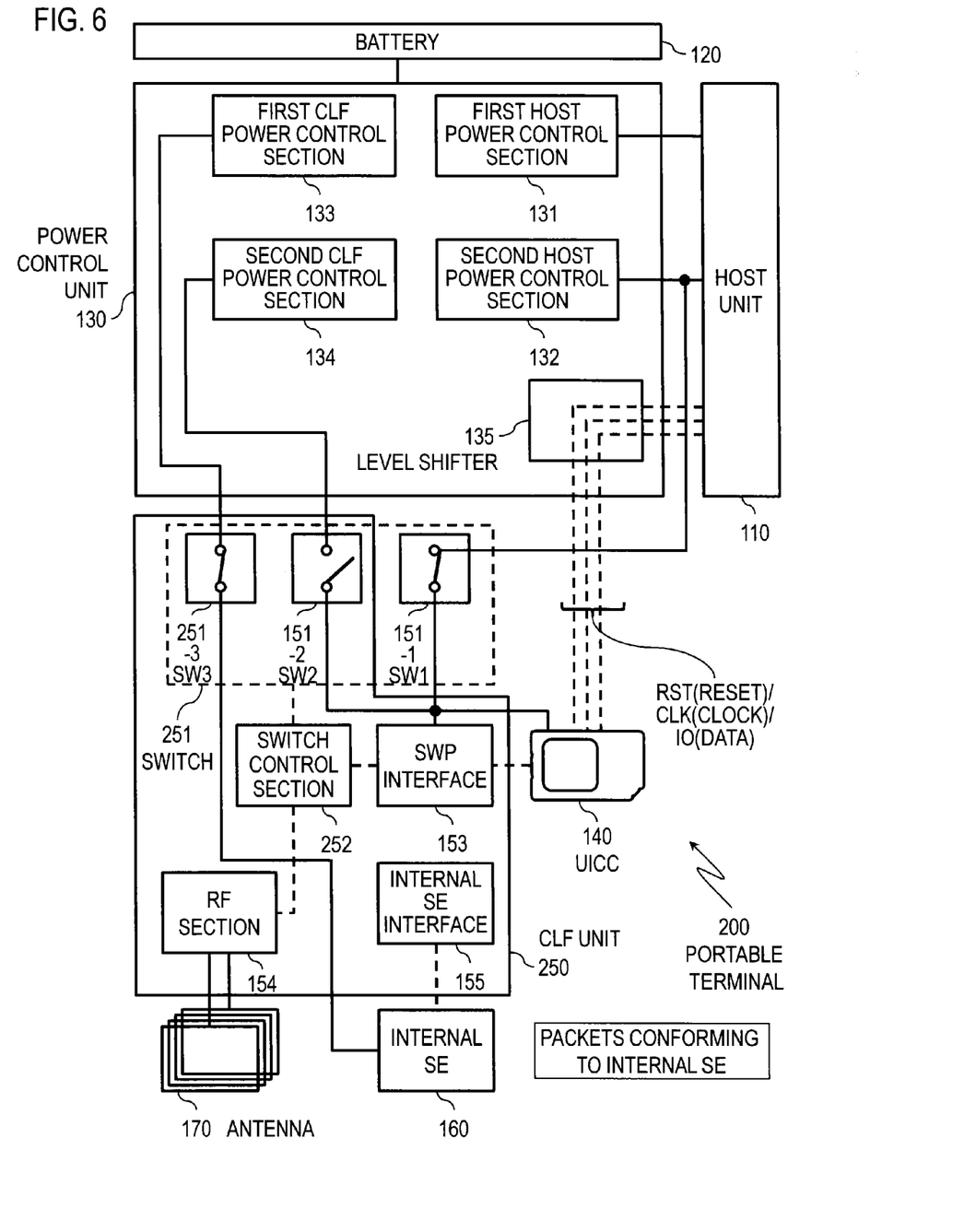
FIG. 6 is a block diagram showing the configuration and another state (packets conforming to the internal SE received) of the portable terminal according to the second embodiment.
Figure 7:
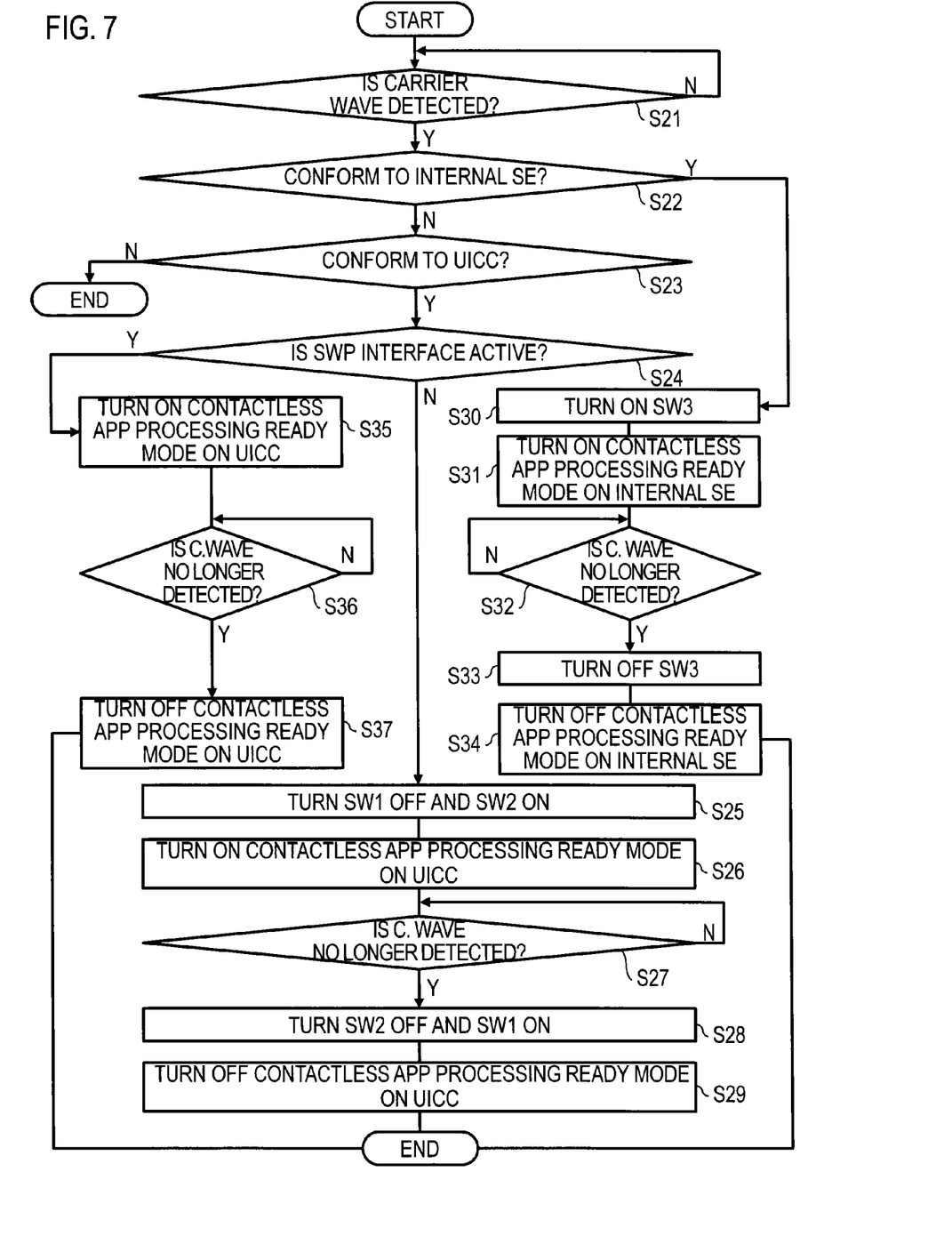
FIG. 7 is a flowchart illustrating the operation of the portable terminal according to the second embodiment.

A portable terminal in a second embodiment, which differs from the portable terminal 100 in the first embodiment in that a function to control the supply of power to the internal SE 160 is added, will be described in detail with reference to FIGS. 4, 5, 6, and 7. FIG. 4 is a block diagram showing the configuration and a state (host on state with UICC packets received) of a portable terminal 200 according to this embodiment. FIG. 5 is a block diagram showing the configuration and another state (host off state or low battery with UICC packets received) of the portable terminal 200 according to this embodiment. FIG. 6 is a block diagram showing the configuration and another state (packets conforming to the internal SE received) of the portable terminal 200 according to this embodiment. FIG. 7 is a flowchart illustrating the operation of the portable terminal 200 according to this embodiment.

The portable terminal 200 in this embodiment includes a host unit 110, a battery 120, a power control unit 130, a UICC 140, a CLF unit 250, an internal SE 160, an antenna 170, and a first switch (SW1) 151-1. The CLF unit 250 includes a second switch (SW2) 151-2, a third switch (SW3) 251-3, a switch control section 252, an SWP interface 153, an RF section 154, and an internal SE interface 155. The first switch (SW1) 151-1, the second switch (SW2) 151-2, and the third switch (SW3) 251-3 are collectively referred to as a switch 251. The portable terminal 200 in this embodiment differs from the portable terminal 100 in the first embodiment in that the switch 251 has three switches (151-1, 151-2, 251-3) and that the switch control section 252 controls the three switches (151-1, 151-2, 251-3). The other elements denoted by the same reference numerals as used in the first embodiment operate in the same way as the corresponding elements denoted by the same reference numerals in the portable terminal 100 of the first embodiment, and their description will be omitted.

As in the portable terminal 100 in the first embodiment, the initial states of the first switch 151-1 and the second switch 151-2 are the closed state and the open state, respectively. If the RF section 154 detects a contactless RF signal (Yes in S21), the switch control section 252 checks whether the contactless RF signal conforms to the communication method of the internal SE 160 (S22). If the contactless RF signal detected by the RF section 154 does not conform to the communication method of the internal SE 160 (No in S22), if the contactless RF signal conforms to the communication method of the UICC 140 (Yes in S23), and if the SWP interface 153 is not active (No in S24) because power is not supplied to the SWP interface 153 through the first switch 151-1, then the switch control section 252 opens the first switch and closes the second switch (S25, states shown in FIG. 5). In that case, the UICC 140 turns on the contactless app processing ready mode (S26). If the carrier wave is no longer detected after that (Yes in S27), the switch control section 252 closes the first switch and opens the second switch to return the switch 251 to the initial state (S28). In that case, the UICC 140 turns off the contactless app processing ready mode (S29, end). If the contactless RF signal detected by the RF section 154 conforms to the communication method of the internal SE 160 (Yes in S22), the switch control section 252 closes the third switch 251-3 (S30). The internal SE 160 turns on the contactless app processing ready mode (S31). When the carrier wave is no longer detected after that (Yes in S32), the switch control section 252 opens the third switch 251-3 (S33). The internal SE 160 turns off the contactless app processing ready mode (S34, end). If the contactless RF signal detected by the RF section. 154 does not conform to the communication method of the UICC 140 in step S23 (No in S23), the switch control section 252 does not perform the subsequent switch control operation (end). If the host unit 110 is on (the SWP interface 153 is active) in step S24 (Yes in S24), the first switch is kept closed, and the second switch is kept open, as in the initial states, and the UICC 140 turns on the contactless app processing ready mode (S35). In that case, power is supplied to the UICC 140 through the first switch 151-1. If the carrier wave is no longer detected after that (Yes in S36), the UICC 140 turns off the contactless app processing ready mode (S37, end).

In the portable terminal 200 in this embodiment, if the host unit 110 is on and if the RF section 154 detects UICC packets, the switches are set as shown in FIG. 4 (the first switch 151-1 is closed, the second switch 151-2 is open, and the third switch 251-3 is open). If the RF section 154 detects UICC packets while the host unit 110 is off or while the portable terminal 200 is in the low battery state, the switches are set as shown in FIG. 5 (the first switch 151-1 is open, the second switch 151-2 is closed, and the switch 251-3 is open). If the RF section 154 detects packets conforming to the internal SE, the switches are set as shown in FIG. 6 (the first switch 151-1 is closed, the second switch 151-2 is open, and the third switch 251-3 is closed).

Although the CLF unit 250 contains the second switch 151-2, the third switch 251-3, and the switch control section 252 in this embodiment, the switch 251 and the switch control section 252 may be disposed independently outside the CLF unit 250.

In the portable terminal 200 in this embodiment, since the switch control section 252 controls the switch 251 in accordance with the state of the host unit 110 and the communication method corresponding to the detected packets, a stable supply of power can be provided to the UICC 140 or to the internal SE 160 efficiently when the carrier wave is detected, even if the host unit 110 is in the power off state or if the portable terminal 200 is in the low battery state. Normally, such as when the host power is on, power is supplied to the chip card in the portable terminal, not through the CLF, and consequently, power wastage and increased startup time can be prevented.

Each type of processing described above may be executed not only time sequentially according to the order in the description but also in parallel or individually when necessary or according to the processing capability of each apparatus that executes the processing. Appropriate changes can be made to the embodiments without departing from the scope of the present invention.

When the configurations described above are implemented by a computer, the processing details of the functions that should be provided by each apparatus are described in a program. When the program is executed by the computer, the processing functions are implemented on the computer.

The program containing the processing details can be recorded in a computer-readable recording medium. The computer-readable recording medium can be any recording medium, such as a magnetic recording device, an optical disc, a magneto-optical recording medium, or a semiconductor memory.

The program is distributed by selling, transferring, or lending a portable recording medium, such as a DVD or a CD-ROM, with the program recorded on it, for example. The program may also be distributed by storing the program in a storage unit of a server computer and transferring the program from the server computer to another computer through a network.

A computer that executes this type of program first stores the program recorded on a portable recording medium or the program transferred from the server computer in its storage unit. Then, the computer reads the program stored in its storage unit and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the above-described processing may be executed by a so-called application service provider (ASP) service, in which the processing functions are implemented just by giving program execution instructions and obtaining the results without transferring the program from the server computer to the computer. The program of this form includes information that is provided for use in processing by the computer and is treated correspondingly as a program (something that is not a direct instruction to the computer but is data or the like that has characteristics that determine the processing executed by the computer).

In the description given above, each apparatus is implemented by executing the predetermined program on the computer, but at least a part of the processing details may be implemented by hardware.

What is claimed is:

1. A portable terminal comprising;
a host;
a battery;
a power controller, which includes a first host power controller, a second host power controller, a first contactless front end (CLF) power controller, and a second CLF power controller;
a chip card in the portable terminal;
a CLF;
an antenna;
a first switch;
a second switch; and
a switch controller,
wherein the power controller supplies power generated by the battery to the host, the chip card in the portable terminal, and the CLF,
the first switch is connected to open or close a power supply channel to the chip card in the portable terminal and a single wire protocol (SWP) interface, branching off from a power supply channel from the second host power controller to the host,
the second switch is connected to open or close a power supply channel to the chip card in the portable terminal and the SWP interface, branching off from a power supply channel from the second CLF power controller to the CLF,
the switch controller opens the first switch and closes the second switch when a) the CLF detects a contactless RF signal, b) the host is off or the portable terminal is in a low battery mode, and c) the contactless RF signal conforms to the communication method of the chip card in the portable terminal, and
the switch controller closes the first switch and opens the second switch when the host is on.

2. The portable terminal according to claim 1, further comprising a third switch and an internal secure element (SE),
wherein the power controller supplies power generated by the battery to the internal SE as well as the host, the chip card in the portable terminal, and the CLF,
the third switch is connected to open or close a power supply channel to the internal SE, branching off from a power supply channel from the first CLF power controller to the CLF, and the switch controller closes the third switch when the CLF detects a contactless RF signal and when the contactless RF signal conforms to the communication method of the internal SE.

3. A non-transitory portable terminal-readable recording medium having recorded thereon a program for causing a portable terminal including a host, a battery, a power controller, which includes a first host power controller, a second host power controller, a first contactless front end (CLF) power controller, and a second CLF power controller, a chip card in the portable terminal, a CLF, an antenna, a first switch, a second switch, and a switch controller, the first switch being connected to open or close a power supply channel to the chip card in the portable terminal and a single wire protocol (SWP) interface, branching off from a power supply channel from the second host power controller to the host, the second switch being connected to open or close a power supply channel to the chip card in the portable terminal and the SWP interface, branching off from a power supply channel from the second CLF power controller to the CLF, to implement a method comprising:

supplying, using the power controller, power generated by the battery to the host, the chip card in the portable terminal, and the CLF;

opening the first switch and closing the second switch, using the switch controller, when a) the CLF detects a contactless RF signal, b) the host is off or the portable terminal is in a low battery mode, and c) the contactless RF signal conforms to the communication method of the chip card in the portable terminal; and closing the first switch and opening the second switch, using the switch controller, when the host is on.

4. The non-transitory portable terminal-readable recording medium having recorded thereon a program for causing a portable terminal according to claim 3, wherein the portable terminal further includes a third switch and an internal secure element (SE), the third switch being connected to open or close a power supply channel to the internal SE, branching off from a power supply channel from the first CLF power controller to the CLF, and the method further comprises:

supplying, using the power controller, power generated by the battery to the internal SE as well as the host, the chip card in the portable terminal, and the CLF; and closing the third switch, using the switch controller, when the CLF detects a contactless RF signal and when the contactless RF signal conforms to the communication method of the internal SE.

* * * * *